Patented Nov. 20, 1928.

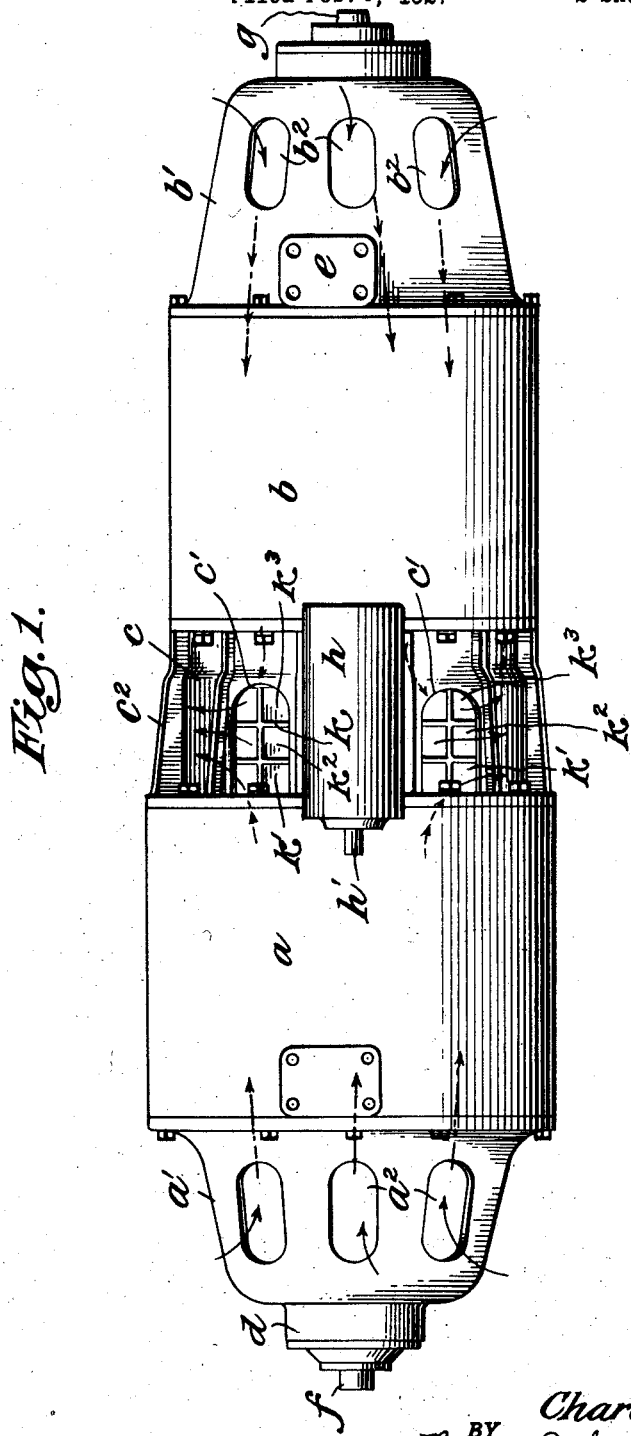

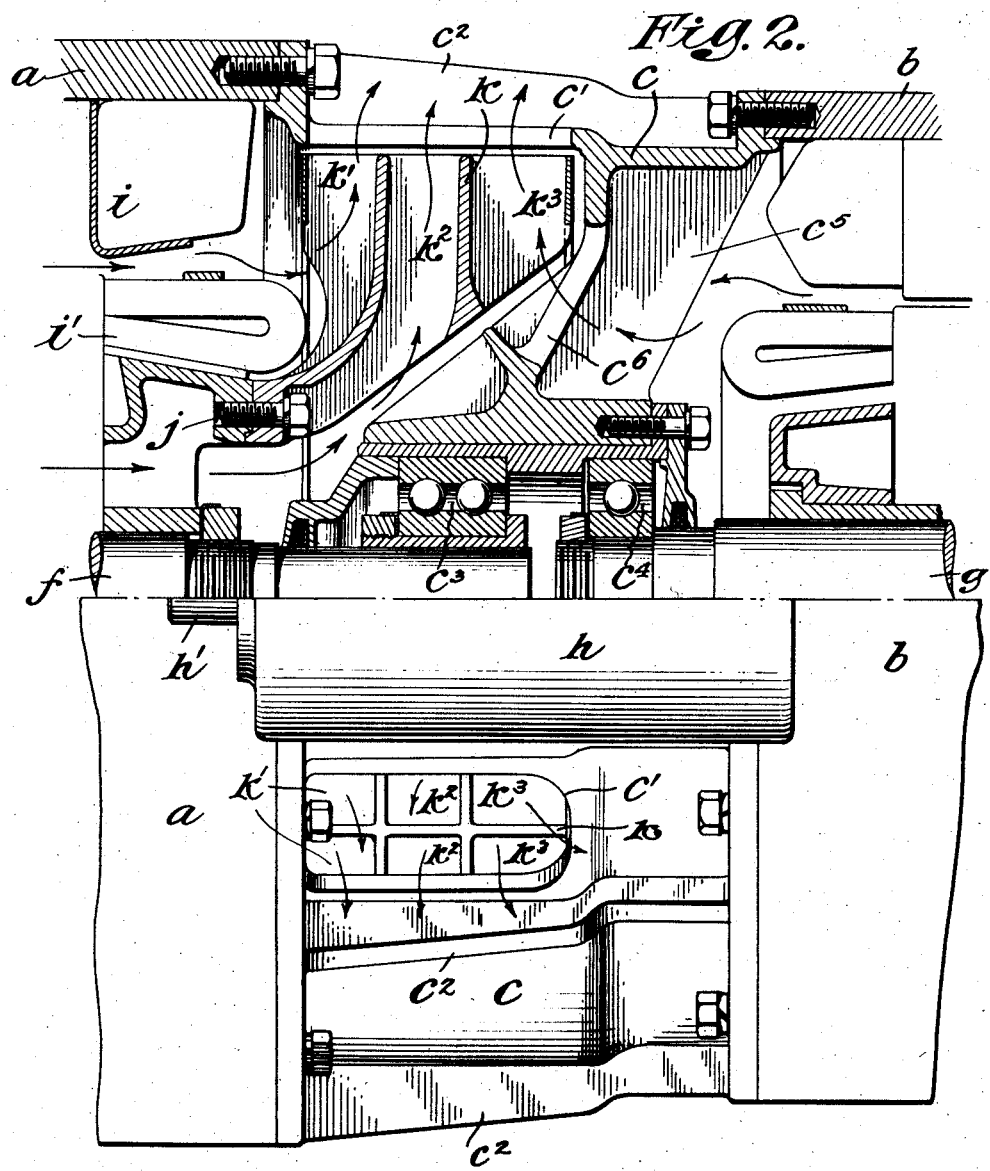

1,692,371

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

COMBINATION ELECTRIC DRIVE.

Application filed February 9, 1927. Serial No. 166,860.

The present invention relates in general to mountings for motor generator sets, and more particularly deals with such mountings in connection with automobiles of the gas-electric drive type. In service of this character, it is highly desirable to reduce the weight of the units and mountings as far as possible, and cut down the room consumed and the length required by these elements.

The present invention seeks to provide a unitary mounting for a motor generator set by means of which the ventilation of the units can be greatly improved, and in addition to cutting down the weight, the overall length taken by the drive may be shortened considerably. Although it is quite general practice to combine the motor and generator units in a single drive, and mount them in a unitary manner, the present construction additionally provides an improved means for ventilating the units and for the control thereof.

Reference will now be had to the accompanying drawings forming a part of the specification, wherein:

Figure 1 is a side elevation of the unit mounting of the present invention.

Figure 2 is a side elevation, partly broken away and in section, showing the fan and associated construction.

In the drawings, $a$ designates the generator and $b$ the motor. Connecting the two is an intermediate housing $c$ which is bolted against the adjacent ends of the generator and motor, and provided with vents $c'$. In order to strengthen the unit and provide a more rugged construction webs $c^2$ may be formed upon the housing. At either end, end caps $a'$ and $b'$ are provided to enclose the unit completely. Suitable vents $a^2$ and $b^2$ are formed in these caps and form the means whereby air enters the units for cooling purposes. A trunnion $d$ on the end cap $a'$ forms the bearing for the generator end and bolting pads $e$, at either side of the end cap $b'$ form a means for supporting the unit at the other end. It will be evident that a three point suspension is provided by reason of this construction and the supports to which the bolting pads are connected may be cushioned in rubber in a well known manner.

The generator is driven from the engine through propeller shaft $f$ and the transmission $g$ supplies the power for the final drive.

An improved feature of the present construction is the mounting of the control upon the unit itself. In carrying out this idea the control box $h$ is mounted upon the housing $c$ as shown in Figures 1 and 2, and the operating shaft for the control is indicated at $h'$. This construction eliminates chassis wiring and is highly desirable from the standpoint of assembling the chassis and the servicing thereof.

Referring particularly to Figure 2, $i$ indicates the field of the generator and $i'$ the armature. Bolted to the armature, as at $j$, is a fan $k$ having three series of blades $k'$, $k^2$ and $k^3$. The housing $c$ mounts the generator armature and motor armature by suitable bearings $c^3$ and $c^4$, respectively, which are carried by the inwardly extending annular web $c^5$. This web is provided with an annular series of openings $c^6$ to permit the proper ventilation of the motor armature. Vanes of the fan serve to ventilate distinct parts of the unit as follows: Vanes $k'$ ventilate the generator field, whereas vanes $k^2$ serve to ventilate the armature exclusively. The arrows in Figure 2 illustrate this quite clearly. Vanes $k^3$ serve to cool the electric motor exclusively and air is drawn from vents $b^2$ through the motor and vents $c^6$ and expelled through vents $c'$. In the ventilation of the generator air is drawn through vents $a^2$, through the field and armature, respectively, and expelled through vents $c'$ by means of the respective blades $k'$ and $k^2$. Obviously, if desired, a double set of vanes with suitable baffles in the housing $c$ may be used to provide separate ventilation for both the motor field and armature core.

By ventilating the units in the manner described above wherein the fan is driven from the generator, it is possible to obtain a high fan speed at low motor and therefore, vehicle speed. This is of great importance when climbing a grade since at that time the motor speed is low, but the generator speed is high. Under these circumstances, greater ventilation is required for the parts than could be obtained by driving a fan from the motor. When the vehicle speed, and therefore the electric motor speed is high, the fan speed cannot be increased beyond the maximum engine speed, and therefore a saving of power is obtained. In a test case, the power consumed by the electric motor fan which is bolted on the electric motor armature was about 2 horsepower at 30 miles per hour and as, at that vehicle speed, the maximum engine power is not required, this horsepower is saved by the mounting of the fan upon the generator and better performance of the bus is obtained. It is evident that the operation of the power units in this form of drive serves to control automatically the speed of the fan to that required under the various conditions of service and a highly desirable unit is provided.

Although the invention has been illustrated and described in connection with the specific construction shown in the drawings, it is not to be limited save as defined by the appended claims.

What I claim is:

1. A combination drive unit comprising motor and generator housings, a motor and generator therein having independently mounted armatures, a housing connecting the two, means therein for supporting the motor and generator armatures independently, vents in the ends of the unit and in the connecting housing, and means carried with the generator armature for ventilating the motor and generator separately.

2. A combination drive unit comprising motor and generator housings, a motor and generator therein having independently mounted armatures, a housing connecting the two, means therein for supporting the motor and generator armatures independently, vents in the ends of the unit and in the connecting housing, a fan carried with the generator armature and a plurality of series of blades thereon for ventilating the motor and generator separately.

3. A combination drive unit comprising motor and generator housings, a motor and generator therein, a housing connecting the two, means therein for supporting the motor and generator armatures, vents in the ends of the unit and in the connecting housing, a fan carried with the generator armature and a plurality of series of blades thereon for ventilating the generator armature, generator field, and the motor separately.

4. A combination drive unit comprising motor and generator housings, a motor and generator therein, a housing connecting the two, means therein for supporting the motor and generator armatures, vents in the ends of the unit and in the connecting housing, a fan carried with the generator armature and having a plurality of axially disposed blades forming a plurality of series of individual ventilating means, and means causing each series to ventilate the generator field, the generator armature, and the motor separately.

5. A combination drive unit comprising motor and generator housings, a motor and generator therein having independently mounted armatures, a housing connecting the two vents in the housings, an inwardly extending annular web carried thereby, a series of openings therein, means on the web for supporting the motor and generator armatures independently, a fan carried by the generator armature, means thereon for ventilating the generator and separate means thereon for ventilating the motor through the openings in the web.

This specification signed this 2nd day of February A. D. 1927.

CHARLES FROESCH.